United States Patent
Boon et al.

[11] Patent Number: 6,053,260
[45] Date of Patent: Apr. 25, 2000

[54] FLAGGER/MARKER/LOCATOR

[76] Inventors: Peter Boon, 13353 Green St.; Jack Bates, P.O. Box 726, both of Grand Haven, Mich. 49417

[21] Appl. No.: 09/102,588

[22] Filed: Jun. 23, 1998

[51] Int. Cl.[7] .................................................. B25C 1/02
[52] U.S. Cl. .................. 173/90; 173/1; 173/91; 227/147
[58] Field of Search .................. 173/90, 91, 1, 173/128, 171, 149; 227/147, 156, 111; 81/489, 492, 177.1, 177.2, 177.8; 294/57, 58; 116/209; 222/174

[56] References Cited

U.S. PATENT DOCUMENTS

| | | | |
|---|---|---|---|
| 3,894,816 | 7/1975 | Davis et al. | 417/413 |
| 4,098,360 | 7/1978 | Clements | 173/147 |
| 4,627,563 | 12/1986 | Meyer | 227/147 |
| 4,706,864 | 11/1987 | Jacobsen et al. | 227/147 |
| 5,010,710 | 4/1991 | Gray et al. | 173/90 |
| 5,020,605 | 6/1991 | Leishman | 173/1 |
| 5,025,969 | 6/1991 | Koester et al. | 227/147 |
| 5,495,878 | 3/1996 | Mckenen, Jr. | 173/90 |
| 5,501,170 | 3/1996 | Walsh | 116/209 |
| 5,562,168 | 10/1996 | Rex | 173/90 |
| 5,592,898 | 1/1997 | Korpi | 116/209 |
| 5,671,814 | 9/1997 | Smith | 173/91 |
| 5,806,453 | 9/1998 | Cook | 173/128 |
| 5,810,408 | 9/1998 | Armstrong | 294/57 |
| 5,918,565 | 7/1999 | Casas | 116/209 |

*Primary Examiner*—Peter Vo
*Assistant Examiner*—Jim Calve
*Attorney, Agent, or Firm*—Price, Heneveld, Cooper, DeWitt & Litton

[57] ABSTRACT

An underground utility line flagger and marker having an elongated main body having an upper end and a lower-end ground penetrator, a forwardly projecting handle at the upper end at an acute angle to the main body, the ground penetrator having a marker flagstaff-engagement recess at the bottom thereof, and a foot-driven projection on the main body whereby the staff of a marker flag lying on the ground can be inserted into the ground with the flag upright by using the handle to place the engagement recess on the flagstaff and stepping on the peg.

24 Claims, 2 Drawing Sheets

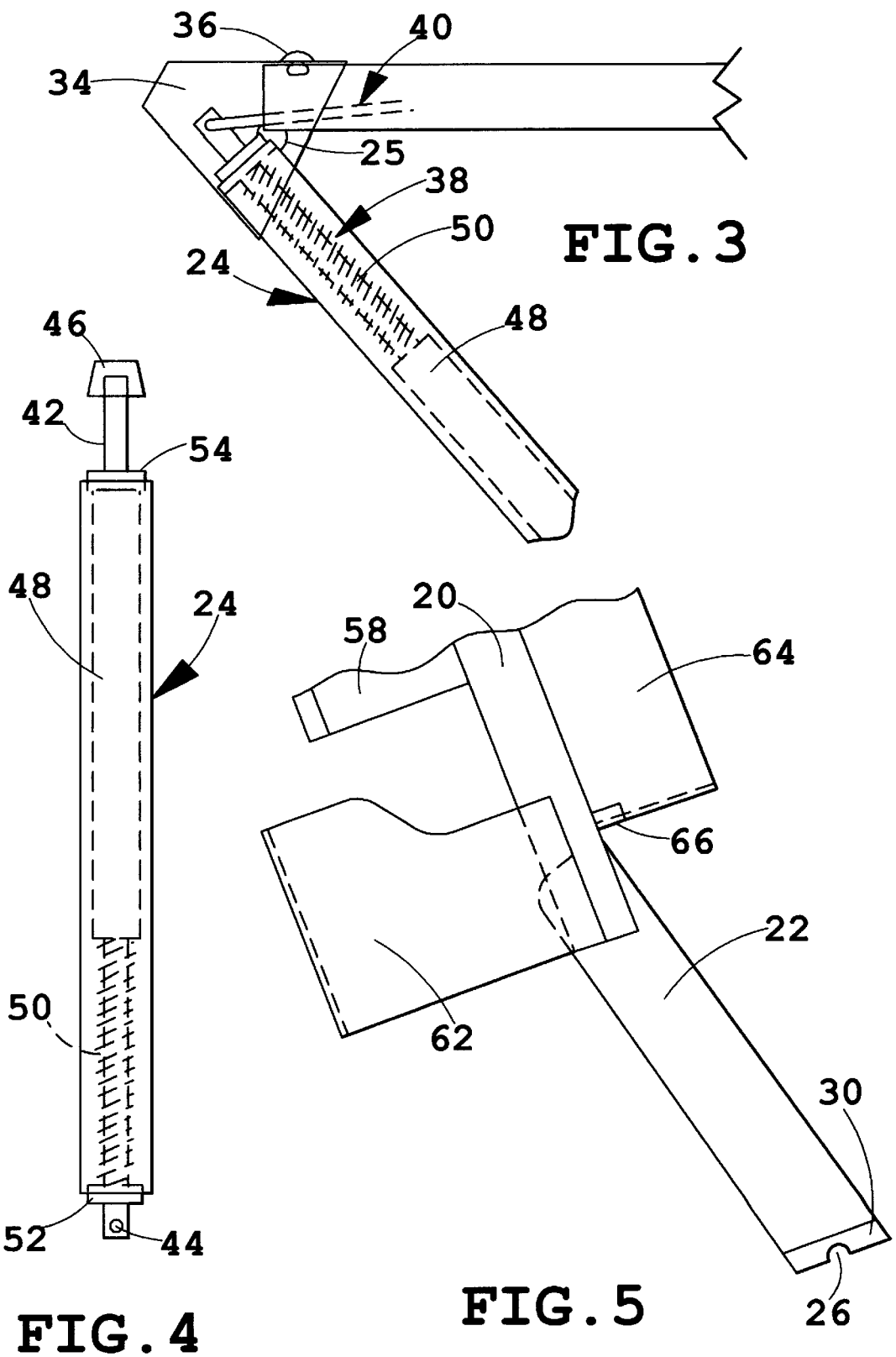

FLAGGER/MARKER/LOCATOR

BACKGROUND OF THE INVENTION

This invention relates to apparatus for detecting and marking and/or flagging underground utility lines such as electrical power, gas, cable tv and telephone lines.

Location and marking of underground utility lines is important in order to avoid accidental disruption of utility services and destruction of utility lines during subsequent earth moving activities. Location is typically done with a detector responsive to metallic components of the utility line, utilizing electromagnetic energy, for example. The line is then flagged and/or marked above ground level by placement of a series of spaced flags and/or applying a bright paint stripe on the ground and/or grass. Placing of such flags by inserting the flag stem into the ground can be tedious and time consuming, as is known. The flags are either manually inserted into the ground or by use of a tool. Either way, the process is tiring to the workman. The same is true for paint striping the ground.

Efforts have been made to lessen the difficulty and tedium of flag insertion by bending the bottom of each flag staff at an angle and pounding it into the ground with a sleeve-type outer pipe movable on an inner rod, comparable to a typical fence post driver, as in U.S. Pat. No. 5,671,814. This still is tedious and leaves much to be desired, however.

SUMMARY OF THE INVENTION

An object of this invention is to provide a unique utility line locator/flagger and/or marker that is comfortable to use, enables the underground line to be readily detected, flag dropped, and then inserted by simply stepping on a foot peg on the tool. The line can also be paint marked by use of an actuator on the handle of the tool. Optionally, a GPS (Global Positioning System) or GIS (Global Information System) is supported by the tool to determine the exact location of the line.

These and other features, advantages and objects of the present invention will be further understood and appreciated by those skilled in the art by reference to the following specification, claims and appended drawings.

BRIEF DESCRIPTION OF THE DRAWINGS

FIG. 3 is a fragmentary view of the upper end of the elongated main body and the forwardly projecting handle portion;

FIG. 4 is an elevational view of the handle; and

FIG. 5 is a fragmentary view of the lower end of the ground penetrator.

DETAILED DESCRIPTION OF PREFERRED EMBODIMENT

Figure 1:
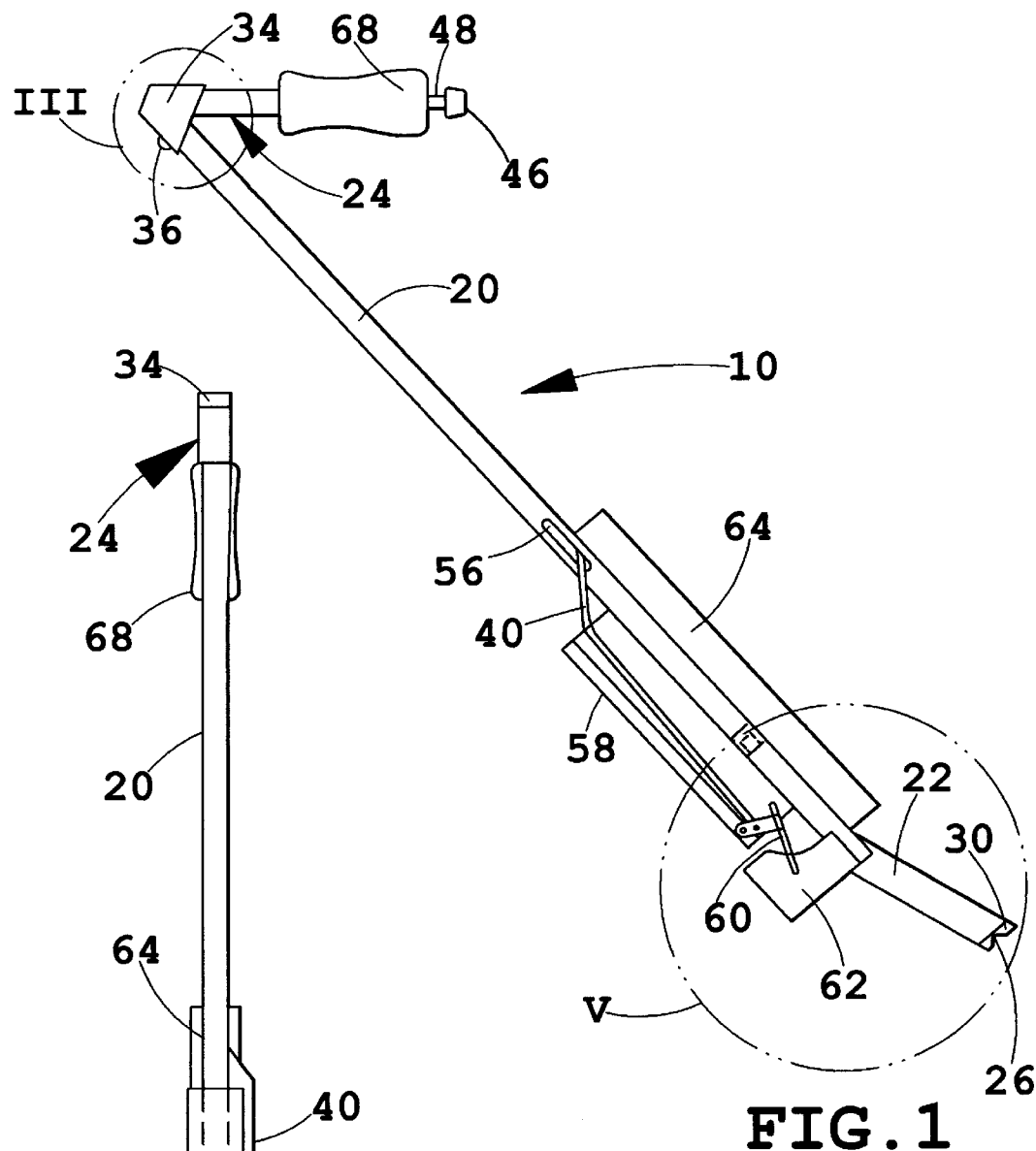
FIG. 1 is a side elevational view of the preferred embodiment.

The underground utility line locator, flagger and/or marker 10 (FIG. 1) has an elongated main body 20 with an upper end and a lower end ground penetrator 22 and a forwardly projecting handle 24. The ground penetrator 22 has a flagstaff-engagement recess 26 at the bottom of the ground penetrator 22. Attached to the main body is a protruding foot-driven projection such as a peg 28 whereby the staff of a marker flag (not shown) lying on the ground can be inserted into the ground with the flag upright by using the handle 24 to place the engagement recess on the flagstaff and stepping on the peg 28.

As seen in FIG. 5, the ground penetrator 22 is attached to the elongated body portion 20 at an obtuse angle such that the ground penetrator 22 projects forward from the elongated body portion 20. The end of the ground penetrator 22 has a knife blade portion 30 allowing easier insertion of the flag into the ground. The flagstaff-engagement recess 26 is generally shaped as an inverted U-shaped notch with an inside radius. The inverted U shape of the recess 26 works more efficiently than an inverted V-shaped notch because the inside radius allows more of the recess 26 to contact the flagstaff thereby more securely gripping the flagstaff. The obtuse angle of the ground penetrator 22 and the secure hold provided by the inverted U-shaped engagement recess 26 enables the lower portion of the flagstaff to bend upon insertion of the flagstaff into the ground, which creates a barb in the flagstaff that prevents easy removal of the flag. The barb helps, by more firmly planting the flagstaff into the ground, to ensure removal of the flag only occurs when removal is actually intended.

Figure 2:
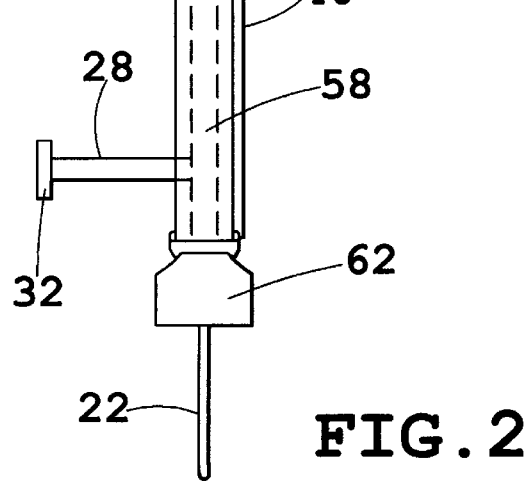
FIG. 2 is a front elevational view of the preferred embodiment.

The horizontal foot peg 28 (FIG. 2) is preferably attached by a weld to the elongated main body 20 at a slight upward tilt from horizontal, preferably at an angle of about 2 degrees from horizontal toward handle 24. A retaining element, such as a washer 32, is attached to the other end of foot peg 28 by a weld. The retaining element 32 aids in preventing the user's foot from slipping off of the peg while the invention is in use.

The handle 24 is attached, preferably by a weld 25, at an acute angle, preferably from 35 to 55 degrees to the body, depending on the weight of the options mounted on the tool, and more preferably at about 48 degrees to elongated main body 20. It has been found that this acute angular arrangement causes the least rearward rotational force on the operator's wrist when the tool is in the optimum installation position. An elbow cover 34 is attached over the juncture of handle 24 with elongated main body 20 by an attachment means such as a rivet or screw 36. Cover 34 dresses up the juncture and also protects the inner actuator 38 and connecting linkage 40 (described below) from damage, dirt, and other debris. The cover is preferably made of metal or plastic.

An actuator 38 (FIG. 4) is contained in handle 24. A rod extends through the handle 24 and has a rod orifice 44 at one end and a button knob 46 at the opposite end. Inside the handle 24 there is a push bar 48 and a biasing element such as a spring 50 around rod 42. The spring 50 and push bar 48 are retained in position by two retaining end plugs such as square washers 52, 54, such that after rod 42 is actuated by the operator pushing on finger or button knob 46, spring 50 returns rod 42 back to its original position.

The orifice 44 is operably connected to the connecting linkage 40 (FIG. 3) which extends through the interior of the elongated main body until it reaches slot 56 (FIG. 1) where it exits the elongated main body 20 and extends along the outside of the paint vessel retainer 58 until it connects to an engagement member such as metal wire 60. Metal wire 60 is pivotally mounted on retainer 58 such that when rod 42 is actuated, the connecting linkage causes the metal wire to pivot and engage a paint vessel nozzle on the bottom end of a pressurized paint can, thereby causing paint spray to be expelled from the paint vessel to mark the ground. Attached to the elongated main body below retainer 58 is a paint windshield 62. The paint windshield assures the correct distance between the ground to be marked and the paint vessel, to assure that the correct amount of paint will be applied to the ground, and protects the paint vessel from dirt and debris which may clog the nozzle of the paint vessel or damage the paint vessel itself.

Also connected to the elongated main body is a flag retainer pocket 64. The flag retainer 64 is attached, preferably by a weld, to the elongated main body, preferably on the opposite side to paint vessel retainer 58, to balance the utilizing line locator, flagger, and/or marker 10. The flag retainer pocket has a drainage hole 66 near the bottom of retainer 64 which prevents buildup of liquid within the retainer when the invention is used in inclement weather. In the preferred embodiment, flag retainer 64 is large enough to hold a standard pack of fifty utility marking flags.

In the preferred embodiment, a grip 68, preferably of polymeric material, is attached to the handle 24. The grip is preferably made of rubber or plastic which is texturized and shaped/contoured to conform to the human hand, thereby providing comfort and stability during use. It is also preferably of electrically non-conductive material for safety reasons.

In another embodiment, a wheel may be mounted on the ground penetrator 22 in order to assure the invention remains at a constant distance from the ground. The use of a pipe and cable locator instrument allows this invention to become not only a marker/flagger but also a pipe and cable locator. A portable GPS (global positioning system) or GIS (global information system) instrument may be used in combination with the present invention to locate utility lines, to document the location of the flagging and marking operations done by the operator, and to ensure correct placement of the flags.

In operating the present invention to designate the correct location of a utility line, cable, or pipe, the operator presses knob 46 which, via connecting linkage 40, causes metal wire 60 to engage the paint vessel nozzle and thereby cause the paint vessel to spray paint onto the ground in the desired location.

In operation, the operator first removes a utility marking flag from the flag retainer 64, drops the utility marking flag onto the ground, and places flagstaff-engagement recess 26 over the flagstaff or stem near the distal end of the stem being inserted into the ground. The operator next steps on foot peg 28 to apply a downward force onto the marker flag stem, thereby forcing it into the ground and moving the flag upright. The use of engagement recess 26 and the obtuse angle of ground penetrator 22 forms a barb in the flag stem when the flag is inserted into the ground, such that unintended removal of the flag is better prevented.

The above description is considered that of the preferred embodiment only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An underground utility line flagger and marker, comprising:
    an elongated main body having an upper end and a lower end, a front surface and a rear surface;
    an elongated, rigid ground penetrating member having a top and a bottom end;
    a handle connected to said upper end and extending from said front surface at an acute angle to said main body;
    said top end of said ground penetrating member connected to said lower end and said front surface of said main body;
    said bottom end of said ground penetrating member having a marker flagstaff-engagement notch in a bottom edge thereof, wherein the ground penetrating member extends downwardly from the lower end and forwardly from the front surface of the main body at an obtuse angle to the main body; and
    a foot driven projection on a lower end of said main body whereby a staff of a marker flag lying on the ground can be inserted into the ground with the flag upright by using the handle to place the engagement notch on the flagstaff and stepping on the foot driven projection.

2. The underground utility line flagger and marker in claim 1, wherein said acute angle is about 35–55 degrees.

3. The underground utility line flagger and marker in claim 1, wherein said acute angle is about 48 degrees.

4. The underground utility line flagger and marker in claim 1, further comprising a utility flag retainer connected to said elongated main body.

5. The underground utility line flagger and marker in claim 4, wherein said utility flag retainer includes a drainage hole to prevent liquid buildup.

6. The underground utility line flagger and marker in claim 5, further comprising a retainer for receiving a pressurized paint retainer connected to said main body;
    an engagement member; and
    an actuator operatively connecting said handle and said engagement member for actuation of a paint vessel in said retainer to mark the ground.

7. The underground utility line flagger and marker in claim 6, wherein said actuator includes connecting linkage.

8. The underground utility line flagger and marker in claim 6, wherein said actuator includes a finger-engageable button knob.

9. The underground utility line flagger and marker in claim 1, wherein said handle includes a grip.

10. The underground utility line flagger and marker in claim 9, wherein said grip is of polymeric material.

11. The underground utility line flagger and marker in claim 10, wherein said grip is shaped/contoured to conform to a human hand thereby providing comfort to the user.

12. The underground utility line flagger and marker in claim 1, wherein said ground penetrator includes a knife portion to facilitate ground penetration.

13. The underground utility line flagger and marker in claim 1, wherein said flagstaff engagement recess is of substantially inverted U shape.

14. The underground utility line flagger and marker in claim 1, wherein said foot driven projection is a peg.

15. The underground utility line flagger and marker in claim 14, wherein said peg is attached to said main body at a slight upward slant toward the handle to help prevent the user's foot from slipping off said peg during operation.

16. The underground utility line flagger and marker in claim 15, wherein said peg includes a retaining element attached to said peg outer end to prevent a user's foot from slipping off said peg during operation.

17. An underground utility line flagger and marker, comprising:
    an elongated main body having an upper end and a lower end, a front surface and a rear surface;
    an elongated, rigid ground penetrating member having a top end and a bottom end wherein said bottom end has a knife blade portion;

a handle connected to said upper end and extending from said front surface at an acute angle to said main body;

said top end of said ground penetrating member connected to said lower end of said main body, wherein the ground penetrating member extends downwardly from the lower end and forwardly from the front surface of the main body at an obtuse angle to the main body;

said knife blade portion further including a marker flagstaff engagement notch in a bottom edge thereof;

a foot driven projection on a lower end of said main body; and a flag having a flagstaff wherein said marker flagstaff engagement notch receives said flagstaff whereby said flagstaff is inserted into the ground by actuating said foot driven projection.

18. The underground utility line flagger and marker in claim 17, wherein said acute angle is about 35–55 degrees.

19. The underground utility line flagger and marker in claim 17, wherein said acute angle is about 48 degrees.

20. The underground utility line flagger and marker in claim 17, further comprising a utility flag retainer connected to said elongated main body.

21. The underground utility line flagger and marker in claim 20, wherein said utility flag retainer includes a drainage hole to prevent liquid buildup.

22. The underground utility line flagger or marker in claim 21, wherein said actuator includes connecting linkage.

23. The underground utility line flagger or marker in claim 21, wherein said actuator includes a finger-engageable button knob.

24. The underground utility line flagger and marker in claim 17, further comprising a paint vessel retainer connected to said main body for receiving a paint vessel;

an engagement member; and an actuator operatively connecting said handle and said engagement member for actuation of a paint vessel in said paint vessel retainer to mark the ground.

* * * * *

UNITED STATES PATENT AND TRADEMARK OFFICE
CERTIFICATE OF CORRECTION

PATENT NO. : 6,053,260
DATED : April 25, 2000
INVENTOR(S) : Peter Boon and Jack Bates It is certified that error appears in the above-identified patent and that said Letters Patent is hereby corrected as shown below:

Column 4, claim 6, line 27;
   "claim 5" should be --claim 4--.

Signed and Sealed this

Twenty-seventh Day of February, 2001

Attest:

NICHOLAS P. GODICI

Attesting Officer     Acting Director of the United States Patent and Trademark Office